US009587706B2

(12) United States Patent
Ebata et al.

(10) Patent No.: US 9,587,706 B2
(45) Date of Patent: Mar. 7, 2017

(54) TORQUE FLUCTUATION ABSORBING APPARATUS

(71) Applicants: AISIN SEIKI KABUSHIKI KAISHA, Kariya-shi (JP); TOYOTA JIDOSHA KABUSHIKI KAISHA, Toyota-shi (JP); AISIN AW CO., LTD., Anjo-shi (JP); EXEDY CORPORATION, Neyagawa-shi (JP)

(72) Inventors: Masaru Ebata, Chita (JP); Toshiya Yamashita, Toyota (JP); Takashi Hori, Anjo (JP); Yasunori Doman, Hirakata (JP)

(73) Assignees: AISIN SEIKI KABUSHIKI KAISHA, Kariya-Shi, Aichi-Ken (JP); TOYOTA JIDOSHA KABUSHIKI KAISHA, Toyota-Shi, Aichi (JP); AISIN AW CO., LTD., Anjo-Shi, Aichi (JP); EXEDY CORPORATION, Neyagawa-Shi, Osaka (JP)

( * ) Notice: Subject to any disclaimer, the term of this patent is extended or adjusted under 35 U.S.C. 154(b) by 180 days.

(21) Appl. No.: 14/347,859

(22) PCT Filed: Sep. 25, 2012

(86) PCT No.: PCT/JP2012/074455
§ 371 (c)(1),
(2) Date: Mar. 27, 2014

(87) PCT Pub. No.: WO2013/047460
PCT Pub. Date: Apr. 4, 2013

(65) Prior Publication Data
US 2014/0256455 A1    Sep. 11, 2014

(30) Foreign Application Priority Data

Sep. 29, 2011   (JP) .................................. 2011-214265

(51) Int. Cl.
*F16F 15/123*   (2006.01)
*F16F 15/121*   (2006.01)
(Continued)

(52) U.S. Cl.
CPC ........ *F16F 15/1213* (2013.01); *F16F 15/123* (2013.01); *F16F 15/12306* (2013.01);
(Continued)

(58) Field of Classification Search
CPC .. F16F 15/1201; F16F 15/1213; F16F 15/123; F16F 15/12306; F16F 15/13107;
(Continued)

(56) References Cited

U.S. PATENT DOCUMENTS 4,739,866 A     4/1988  Reik et al.
4,946,420 A *   8/1990  Jackel ................... F16F 15/131
                                                    192/113.4
(Continued)

FOREIGN PATENT DOCUMENTS

EP   2 103 838 A2   9/2009
FR   2 700 191 A1   7/1994
(Continued)

OTHER PUBLICATIONS

The extended European Search report issued on Apr. 7, 2015, in corresponding European Patent Office Application No. 12835556.7-1755.
(Continued)

*Primary Examiner* — Josh Skroupa
(74) *Attorney, Agent, or Firm* — Buchanan Ingersoll & Rooney PC (57) ABSTRACT

A torque fluctuation absorbing apparatus is capable of securely sealing a space housing an elastic member even on application of a centrifugal force or at the time of cooling. The torque fluctuation absorbing apparatus includes a center
(Continued)

plate, a side plate(s) (side plate assembly) coaxial with the center plate and slidably relative to the center plate, and an elastic member housed within a space delimited by the side plate assembly to absorb torque fluctuations between the side plate assembly and the center plate. The apparatus also includes a cover member secured to the center plate and slidably pressure contacted with the side plate assembly to cover from outside a space housing the elastic member, and a suppressing section capable of suppressing the cover member from deforming under a pressure acting on the cover member when atmospheric pressure within the space housing the elastic member(s) becomes lower than outside atmospheric pressure.

9 Claims, 3 Drawing Sheets

(51) Int. Cl.
*F16F 15/134* (2006.01)
*F16F 15/16* (2006.01)
*F16H 45/02* (2006.01)

(52) U.S. Cl.
CPC .......... *F16F 15/134* (2013.01); *F16F 15/165* (2013.01); *F16F 2230/10* (2013.01); *F16F 2230/30* (2013.01); *F16H 2045/0205* (2013.01); *F16H 2045/0221* (2013.01); *F16H 2045/0278* (2013.01)

(58) Field of Classification Search
CPC .. F16F 15/134; F16F 15/13469; F16F 15/165; F16F 2230/10; F16F 2230/105; F16F 2230/30; F16H 45/02; F16H 2045/0221; F16H 2045/0252; F16H 2045/0278
USPC ............ 464/7, 17, 67.1, 68.1, 68.3; 192/208
See application file for complete search history.

(56) References Cited

U.S. PATENT DOCUMENTS

| | | | | |
|---|---|---|---|---|
| 5,242,328 | A * | 9/1993 | Friedmann | F16F 15/13128 192/204 |
| 5,352,156 | A | 10/1994 | Klein et al. | |
| 5,393,266 | A | 2/1995 | Braun et al. | |
| 5,435,783 | A | 7/1995 | Rohrle | |
| 5,569,088 | A * | 10/1996 | Schierling | F16F 15/13178 464/64.1 |
| 5,601,492 | A * | 2/1997 | Schierling | F16F 15/13164 464/24 |
| 5,784,928 | A | 7/1998 | Mokdad et al. | |
| 6,014,912 | A * | 1/2000 | Carlson | F16F 15/13114 192/70.17 |
| 6,524,190 | B1 * | 2/2003 | Strauss | F16F 15/1397 464/64.1 |
| 6,620,048 | B2 | 9/2003 | Gillmann et al. | |
| 2002/0032061 | A1 | 3/2002 | Gillmann et al. | |
| 2002/0128074 | A1 | 9/2002 | Jackel et al. | |
| 2010/0248846 | A1 | 9/2010 | Saeki et al. | |

FOREIGN PATENT DOCUMENTS

| | | |
|---|---|---|
| GB | 2 288 652 A | 10/1995 |
| JP | 9-502504 A | 3/1997 |
| JP | H11-315889 A | 11/1999 |
| JP | 2010-223401 A | 10/2010 |
| WO | 99/31405 A1 | 6/1999 |
| WO | WO 2012/050039 A1 | 4/2012 |

OTHER PUBLICATIONS

International Search Report (PCT/ISA/210) mailed on Dec. 4, 2012, by the Japanese Patent Office as the International Searching Authority for International Application No. PCT/JP2012/074455.

* cited by examiner

TORQUE FLUCTUATION ABSORBING APPARATUS

TECHNICAL FIELD

This invention relates to a torque fluctuation absorbing apparatus.

BACKGROUND

This invention claims priority based on JP Patent Application 2011-214265 filed on Sep. 29, 2011, the entire contents thereof being incorporated by reference into the present application.

The torque fluctuation absorbing apparatus is arranged on a path of transmission of motive power between an engine and a transmission (speed changing unit) to absorb (suppress) torque fluctuations produced between the engine and the transmission. Among the torque fluctuation absorbing apparatus of various types, there is such a one including a damper unit that absorbs torque fluctuations by way of the force of elasticity (spring force). The damper unit has a structure that includes an elastic member (a coil spring) arranged for extending in a circumferential direction between two rotating members. When the two rotating members rotate relative to each other, the coil spring compresses to absorb the torque fluctuations.

Among the torque fluctuation absorbing apparatus including such damper units, there is such an apparatus in which one of the rotating members is disposed on an outer rim or on both sides of the other rotating member, and a gap or interstice between the one and the other rotating member(s) is closed by a sealing member for sealing a space within which the coil spring is housed. For example, Patent Document 1 shows such apparatus in which leaf springs (50e, 52e of FIG. 8 of Patent Document 1) are disposed in a gap or interstice between cover disk members (14e, 16e of FIG. 8 of Patent Document 1) and a central disk member (24e of FIG. 8 of Patent Document 1). The leaf springs are configured to slidably contact with inner surfaces (the coil spring housing side surfaces) of the cover disk members. Patent Document 2 also shows an apparatus having a sealing structure similar to that of Patent Document 1.

Patent Document 1: EP2103838A
Patent Document 2: United States Patent Application 2002/0128074A

SUMMARY

The following analysis is given by the inventors of the present application.

It is noted that the entire contents of disclosures of the above mentioned Patent Documents 1, 2 are to be incorporated herein by reference. The following analysis is given by the present invention.

In the sealing structure of Patent Document 1, the leaf springs contact with the inner side surfaces of the cover disk members. There is thus a possibility that, in an environment where there is muddy water around the sealing structure, the muddy water accumulated in the gap or interstice between the leaf springs and the cover disk members intrudes into the inside of the coil housing space.

For example, in the sealing structure as disclosed in Patent Document 1, the leaf springs have inner rim portions fastened by rivets to the central disk member, while having outer rim portions tilted toward the axial direction to be in pressure contact with the cover disc members. Thus, should there act an centrifugal force caused by revolutions, the outer rim portions of the leaf springs are deformed in a direction away from the cover disk members, thus deteriorating the sealing performance between the outer rim portions of the leaf springs and the cover disk members. Moreover, since the centrifugal force acts on the muddy water as well, it is likely that the muddy water intrudes into the inside of the sealing structure through a gap between the outer rim portions of the leaf springs and the cover disk members.

In addition, in the sealing structure as disclosed in Patent Document 1, the atmospheric pressure in the coil spring housing space becomes lower than the outside atmospheric pressure as the cover disk members heated during the driving are cooled by the muddy water. If, at such time, the muddy water has become affixed to contact portions between the outer rim portions of the leaf springs and the cover disk members, it is likely that such muddy water is introduced by suction due to a pressure difference into the coil spring housing space.

It is a principal object of the present invention to provide a torque fluctuation absorbing apparatus in which the elastic member housing space can be securely sealed even when the centrifugal force acts or cooling occurs.

A torque fluctuation absorbing apparatus according to a first aspect of the present invention includes a center plate disposed rotatably, a side plate(s) (refer to as "side plate assembly") disposed coaxially with and rotatably relative to the center plate, and an elastic member(s) housed within a space delimited by the side plate assembly to absorb torque fluctuations produced between the side plate assembly and the center plate. The torque fluctuation absorbing apparatus also includes a cover member secured to one of the center plate and the side plate assembly in intimate (tight) contact therewith in a continuous (non-interrupted) manner throughout in a circumferential direction. On the other hand, the cover member is slidably pressure contacted with the other of the center plate and the side plate(s) in a continuous (non-interrupted) manner throughout in the circumferential direction, in such a manner that a space housing the elastic member(s) therein will be shielded from outside. The torque fluctuation absorbing apparatus further includes a suppressing section capable of suppressing the cover member from becoming deformed under a pressure acting on the cover member when an atmospheric pressure within the space housing the elastic member(s) therein has become lower than an outside atmospheric pressure.

In the torque fluctuation absorbing apparatus according to the present invention, the suppressing section is preferably capable of suppressing the cover member from becoming deformed under a centrifugal force acting on the cover member.

In the torque fluctuation absorbing apparatus according to the present invention, the suppressing section is preferably formed on the other of the center plate and the side plate assembly.

A torque fluctuation absorbing apparatus according to a second aspect of the present invention includes a center plate disposed rotatably, a side plate(s) (referred to as "side plate assembly") disposed coaxially as and configured for making rotation relative to the center plate, and an elastic member(s) housed within a space delimited by the side plate assembly to absorb torque fluctuations produced between the side plate assembly and the center plate. The torque fluctuation absorbing apparatus also includes a cover member secured to one of the center plate and the side plate assembly in intimate (tight) contact therewith in a continuous (non-interrupted) manner throughout in a circumferential direction. The cover member is also slidably pressure contacted with the other of the center plate and the side plate assembly in a continuous (non-interrupted) manner throughout in the circumferential direction, in such a manner that a space housing the elastic member(s) therein will be shielded from outside. The cover member is so configured as to elevate performance of intimate contact thereof with respect to the other of the center plate and the side plate assembly when an atmospheric pressure within the space housing the elastic member(s) therein has become lower than an outside atmospheric pressure.

In the torque fluctuation absorbing apparatus according to the present invention, the cover member is preferably so configured as to elevate the performance of the intimate contact thereof with respect to the other of the center plate and the side plate assembly when there acts a centrifugal force.

In the torque fluctuation absorbing apparatus according to the present invention, preferably the cover member is an annular plate-shaped member.

In the torque fluctuation absorbing apparatus according to the present invention, preferably the cover member is pressure contacted with the side plate assembly in a state in which a portion of the cover member pressure contacted with the side plate assembly is flexed from its free condition in a direction away from the center plate.

In the torque fluctuation absorbing apparatus according to the present invention, preferably a surface of the cover member attached to the center plate is pressure contacted with the side plate assembly.

In the torque fluctuation absorbing apparatus according to the present invention, preferably one side of the side plate assembly directed to the center plate has an inner peripheral end face radially outwardly of a portion of the cover member at which the cover member is secured to the center plate. A corner of the inner peripheral end face of the side plate assembly remoter from the center plate preferably includes an abutting (thrusting) portion disposed so as to have pressure contact with the cover member.

In the torque fluctuation absorbing apparatus according to the present invention, preferably the corner of the inner peripheral end face of the side plate assembly remoter from the center plate is radially at the same position as or offset radially inwardly of a corner of the inner peripheral end face closer to the center plate.

In the torque fluctuation absorbing apparatus according to the present invention, preferably the abutting (thrusting) portion of the side plate assembly has a curved profile.

In the torque fluctuation absorbing apparatus according to the present invention, preferably the abutting portion of the side plate assembly is disposed axially offset from the site of connection between the center plate and the elastic member(s).

In the torque fluctuation absorbing apparatus according to the present invention, preferably the abutting portion of the side plate assembly is disposed radially inward of an outer peripheral end face of the cover member(s).

In the torque fluctuation absorbing apparatus according to the present invention, preferably at an opposite site of the side plate assembly relative to the center plate, the side plate includes a cylindrical portion radially inward of the center plate. Preferably, the cylindrical portion carries the center plate for rotation via a bearing.

According to the present invention, the performance of intimate (tight) contact of the cover member with the side plate assembly increases in case an atmospheric pressure in the space housing the elastic member therein becomes lower than an outside atmospheric pressure. Hence, even if muddy water is present accumulated near the outer side of the cover member, it is possible to prevent such muddy water from intruding into the space housing the elastic member(s) therein.

MODES

A torque fluctuation absorbing apparatus according to an exemplary embodiment 1 of the present invention includes a center plate (23 of FIG. 1), disposed rotatably, side plates (i.e., side plate assembly 17, 18 of FIG. 1) disposed coaxially with and rotatably relative to the center plate, and elastic members (34, of FIG. 1) housed within a space delimited by the side plate assembly to absorb torque fluctuations produced between the side plates and the center plate. The torque fluctuation absorbing apparatus also includes a cover member (25 of FIG. 1) secured to one of the center plate and the side plate assembly in intimate (tight) contact therewith in a continuous (non-interrupted) manner throughout in a circumferential direction. The cover member is also slidably pressure contacted with the other of the center plate and the side plate assembly in a continuous (non-interrupted) manner throughout in the circumferential direction, in such a manner that a space housing the elastic member(s) therein will be shielded from outside. The torque fluctuation absorbing apparatus further includes a suppressing section capable of suppressing the cover member (25 of FIG. 1) from becoming deformed under a pressure acting on the cover member when an atmospheric pressure within the space housing the elastic member(s) therein has become lower than an outside atmospheric pressure.

The torque fluctuation absorbing apparatus according to an exemplary embodiment 2 of the present invention includes a torque fluctuation absorbing apparatus includes a center plate (23 of FIG. 1) disposed rotatably and side plates (i.e. side plate assembly 17, 18 of FIG. 1) disposed coaxially with and rotatably relative to the center plate. The torque fluctuation absorbing apparatus also includes elastic members (34, 35 of FIG. 1) housed within a space delimited by the side plate assembly to absorb torque fluctuations produced between the side plate assembly and the center plate. The torque fluctuation absorbing apparatus further includes a cover member (25 of FIG. 1) secured to one of the center plate and the side plate assembly in intimate (tight) contact therewith in a continuous (non-interrupted) manner throughout in the circumferential direction. The cover member is also slidably pressure contacted with the other of the center plate and the side plate assembly in a continuous (non-interrupted) manner throughout in the circumferential direction, in such a manner that the space housing the elastic member(s) therein will be shielded from outside. The cover member is configured so as to elevate performance of the intimate contact thereof with respect to the other of the center plate and the side plate assembly when an atmospheric pressure within the space housing the elastic member(s) therein has become lower than an outside atmospheric pressure.

It should be noted that symbols for reference to the drawings are used in the present application merely to assist in the understanding without intention to limit the present invention to the mode(s) illustrated.

EXAMPLE 1

Figure 1:
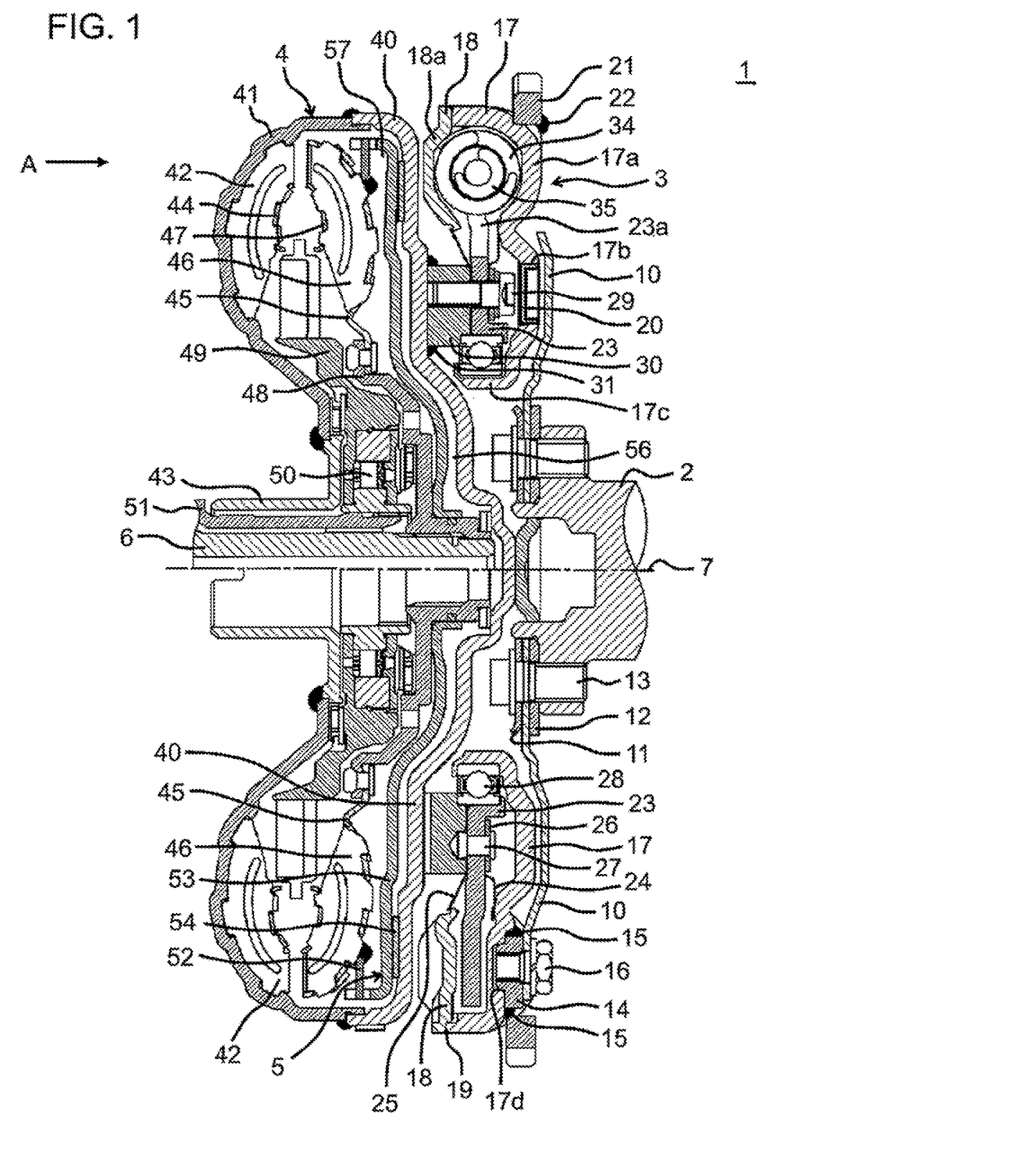
FIG. 1 is a cross-sectional view, taken along line X-X' of FIG. 2, schematically showing a formulation of a motive power transmitting system including a torque fluctuation absorbing apparatus according to Example 1 of the present invention.
Figure 2:
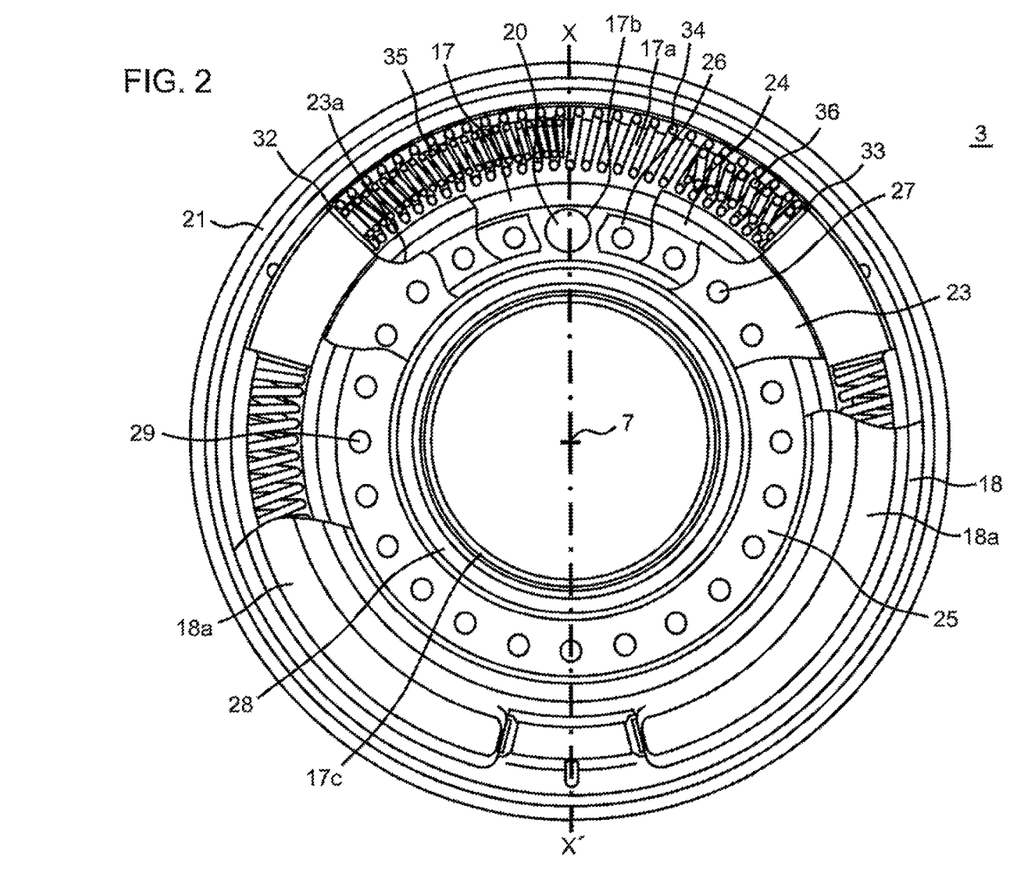
FIG. 2 is a plan view, looking along arrow A of FIG. 1, schematically showing the formulation of the torque fluctuation absorbing apparatus according to Example 1 of the present invention.
Figure 3:
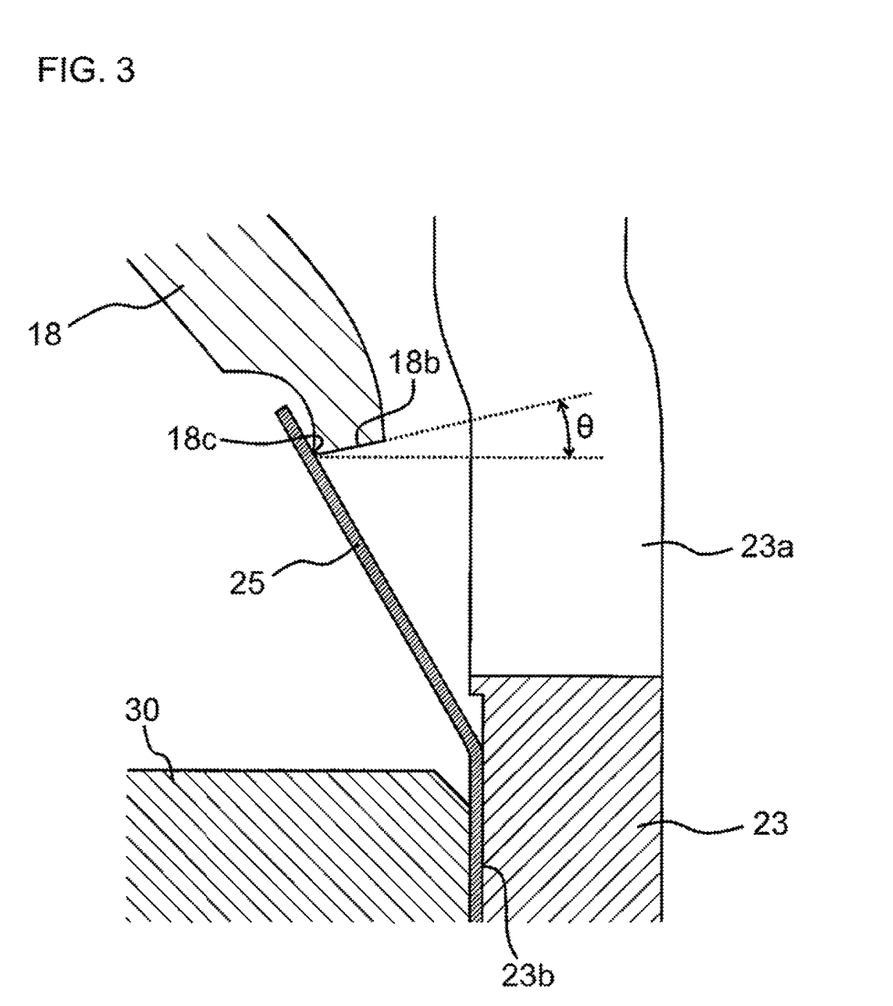
FIG. 3 is an enlarged cross-sectional view schematically showing a formulation of a sealing portion in the torque fluctuation absorbing apparatus according to Example 1 of the present invention.

A torque fluctuation absorbing apparatus according to Example 1 of the present invention will now be described with reference to the drawings. FIG. 1 depicts a cross-sectional view, taken along line X-X' of FIG. 2, and schematically showing a formulation of a motive power transmitting mechanism including the torque fluctuation absorbing apparatus according to Example 1 of the present invention. FIG. 2 is a plan view, looking from the direction indicated by arrow A of FIG. 1, and schematically showing a formulation of a torque fluctuation absorbing apparatus according to Example 1 of the present invention. FIG. 3 is an enlarged cross-sectional view schematically showing a formulation of a sealing section of the torque fluctuation absorbing apparatus according to Example 1 of the present invention.

Referring to FIG. 1, a motive power transmitting system 1 is such an arrangement that transmits the motive power of rotation of an engine (an internal combustion engine, not shown) to a transmission (speed unit), not shown. The motive power transmitting system 1 includes a torque fluctuation absorbing apparatus 3 and a torque converter 4 arranged in series with each other on a path of transmitting of the motive power between a crankshaft 2 of an engine and an input shaft 6 of the transmission. The crankshaft 2 and the input shaft 6 are coaxially arranged on an axis of rotation 7.

The torque fluctuation absorbing apparatus 3 is such an arrangement that absorbs (suppresses) torque fluctuations produced between the engine and the transmission (see FIGS. 1 and 2). The torque fluctuation absorbing apparatus 3 is arranged on a path of motive power transmitting between the crankshaft 2 and the torque converter 4, more specifically, a front cover 40. The torque fluctuation absorbing apparatus 3 includes a damper section that absorbs torque fluctuations by way of the force of elasticity (spring force). The torque fluctuation absorbing apparatus 3 includes as its principal components, a drive plate 10, side members 11, 12, a bolt(s) 13, a block member 14, a weld 15, a bolt 16, side plates (side plate assembly) 17, 18, a weld 19, a cap 20, a ring gear 21, a weld 22, a center plate 23, cover members 24, 25, a side member 26, a rivet(s) 27, a bearing 28, a bolt(s) 29, a block member 30, a weld 31, seat members 32, 33, an outer coil spring(s) 34 and inner coil springs 35, 36.

The drive plate 10 is a disk-shaped plate member that delivers the motive power of rotation from the crankshaft 2 to the torque fluctuation absorbing apparatus 3 (see FIG. 1). The drive plate 10 is fastened (connected) to the crankshaft 2 by a plurality of bolts 13 in a state where the drive plate has its radially inner portion clamped between the side members 11, 12. The drive plate 10 thus rotates in unison with the crankshaft 2. The drive plate 10 is fastened at its radially outer portion by a plurality of bolt(s) 16 to the block member 14 configured for interaction therewith.

The side member 11 is an annular plate-shaped member configured to provide a stabilized seating surface for a head part of the bolt 13 and to assure a prolonged useful life of the drive plate 10 (see FIG. 1). The side member 11 is disposed between the head part of the bolt 13 and the drive plate 10 and is fastened (connected) to the crankshaft 2 by a plurality of bolts 13 together with the drive plate 10 and the side member 12.

The side member 12 is an annular plate-shaped member that assures a prolonged useful life of the side plate 10 against vibrations or the like (see FIG. 1). The side member 12 is disposed between the drive plate 10 and the crankshaft 2, and is fastened (connected) to the crankshaft 2 by a plurality of bolts 13 together with the drive plate 10 and the side member 11.

The bolts 13 are members used for fastening (connecting) the drive plate 10 and the side members 11, 12 to the crankshaft 2 (see FIG. 1).

The block member 14 is a block-shaped member used to fasten the drive plate 10 in position by means of bolts 16 (see FIG. 1). The block member 14 is mounted in a recess 17d in the side plate 17 located at a site of interruption of a housing section 17a in the side plate 17 in the circumferential direction. It is within the housing section 17a that the coil springs 34 to 36 are housed. In other words, the block member 14 is disposed at a location devoid of the housing section 17a so as to complement the housing section in the circumferential direction. The block member 14 is rigidly connected by weld 15 to the side plate 17 at radially outer sites and at radially inner sites. At a site corresponding to the bolt 16, the block member 14 includes a female threaded portion by means of which the block member may be connected by screw connection to the bolt 16. The block member 14 is fastened (connected) by bolt 16 to the drive plate 10, whereby the block member may rotate in unison with the drive plate 10 and the side plate 17.

The block member 14 is rigidly attached by the welds 15 to the side plate 17 (see FIG. 1). The welds 15 serve for rigidly connecting the radially outer and inner sites of the block member 14 to the side plate 17.

The bolt 16 is a member that serves for fastening (connecting) the drive plate 10 to the block member 14 (see FIG. 1).

The side plate 17 is an annular member (see FIGS. 1 and 2). A radially inner portion of the side plate 17 is protruded towards the front cover 40 to form a cylindrical portion 17c. An inner race of the bearing 28 is attached by press fitting and staking the outer peripheral surface of the cylindrical portion 17c of the side plate 17 so that the center plate 23 is carried for allowing rotation by the bearing 28. The side plate 17 includes a through-hole 17b into which the bolt 29 is passed. The cap 20 that stops up the through-hole 17b in its entirety is mounted in the through-hole 17b. The side plate 17 has a protruding (rigid portion obtainable by draw-forming) portion extending radially through its entire periphery between the through-hole 17b and the housing section 17a the protruding portion protruding towards the side of the center plate 23. The protruding portion has a slidable pressure contact over its entire periphery with and slides against the cover member 24. The cover member 24 shields a portion(s) configured for housing the coil springs 34 to 36 therein at an interstice(s) disposed between the side plate 17 and the center plate 23. A radially outer portion of the side plate 17 includes pouch-like housing sections 17a within which the seat members 32, 33 and the coil springs 34, 35 and 36 are housed. The radially outer portion of the side plate 17 also sustains the centrifugal force of the coil springs 34 to 36 and the seat members 32, 33 as well as a radial component force of the coils in the compressed state. End faces in the circumferential direction of the housing section 17a may be brought into contact with or away from the seat members 32, 33. Specifically, when the side plates (side plate assembly) 17, 18 and the center plate 23 are not distorted relative to each other, the end faces of the housing section 17a are in contact with both the seat members 32, 33 or at positions adjacent thereto with only little end play or clearance. When the side plates (side plate assembly) 17, 18 and the center plate 23 become distorted relative to each other, an end face of the housing section is contacted with one of the seat members 32, 33. The side plate 17 has a recess 17d on a site of its surface directed towards the side plate 10. The recess 17d is formed in a location of the side plate 17 where the housing section 17a is interrupted in the circumferential direction. It is at the recess 17d that the block member 14 is attached. The recess 17d may be formed by machining or press forming. The block member 14 is rigidly attached to the recess 17d of the side plate 17 by the welds 15. The side plate 17 is formed so as to cover the radially outer side of the outer coil spring(s). The side plate 17 is fitted at its outer peripheral surface into the inside of the ring gear 21, which ring gear is rigidly attached in position by the weld 22. The side plate 17 is at its end part, directed to the torque converter 4, tightly contacted with the side plate 18 over the entire circumference thereof and is rigidly connected to the side plate 18 by the weld 19.

The side plate 18 is an annular member (see FIG. 1 to 3). The side plate 18 is disposed at a preset distance from and on the radially outer side of the annular block member 30. The radially outer side part of the side plate 18 is tightly contacted with the side plate 17 over the entire circumference of the side plate 18 and is rigidly connected to the side plate 17 by the weld 19. Hence, the side plate 18 rotates in unison with the side plate 17, while there is no risk of leakage of a lubricant contained in the inside via a connecting portion between the side plates 17 and 18. The side plate 18 has, in a mid part along its width, a pouch-shaped or recessed housing section(s) 18a in which the seat members 32, 33 and the coil springs 34 to 36 are housed. The housing section 18a may be brought into contact with or away from the seat members 32, 33 at its end faces along the circumferential direction. When no torsion is produced between the side plates 17, 18 and the center plate 23, the end faces of the housing section 18a are in a state in contact with both the seat members 32, 33 or are proximate thereto with only small end play or clearance in-between. However, when torsion is produced between the side plates 17, 18 and the center plate 23, one of the end faces of the housing section is brought into contact with one of the seat members 32, 33. An inner peripheral end face 18b of the side plate 18, offset more radially inwardly than the housing section 18a, is protruded towards the center plate 23 over the entire circumference of the side plate. An abutting portion 18c on a side of the inner peripheral end face 18b remoter from the center plate 23, that is, on a side thereof directed to the front cover 40, is slidably pressure-contacted with the cover member 25 over the entire circumference of the side plate 18. This shields, from outside, a space in which the coil springs 34 to 36 are housed.

The inner peripheral end face 18b is so formed that its corner closer to the center plate 23 is radially at the same position (radial distance) as or radially greater in distance than its corner disposed remoter from the center plate, that is, closer to the front cover 40. More concretely, the two corners form an angle θ equal to or greater than 0 degree with the axis of rotation 7. By so doing, in case a lubricant, such as grease, is sealed in a space in which the coil springs 34 to 36 are housed, it becomes possible to prevent leakage to outside of the lubricant affixed to the abutting portion 18c. On the abutting surfaces between the abutting portion 18c and the cover member 25, there is generated a hysteresis torque due to a frictional force resulting from a pivoting motion or a relative rotation between the abutting portion 18c and the cover member 25. By this hysteresis torque, it is possible to lessen the variations in the rotation at the damper section formed by the coil springs 34 to 36. The abutting portion 18c is formed as a curved surface to reduce the surface pressure against the cover member 25. This suppresses wear otherwise caused to the abutting portion 18c and the cover member 25 due to rotation or sliding thereof relative to each other. The abutting portion 18c is disposed at the extreme end of the inner peripheral end face 18b facing the front cover 40 in the axial direction, that is, on the left-hand side of FIG. 3. By so doing, if there acts a centrifugal force as a result of revolutions, such a force will be exerted that will raise the contact pressure between the cover member 25 and the abutting portion 18c, thereby securely closing the abutting surfaces between the cover member 25 and the abutting portion 18c.

The weld 19 serves for rigidly attaching the side plates 17, 18 together (see FIG. 1).

The cap 20 is a member that stops up the through-hole 17b of the side plate 17 in its entirety and is attached to the through-hole 17b (see FIG. 1).

The ring gear 21 is a ring-shaped gear having gear teeth on its outer circumferential surface (see FIGS. 1 and 2). The ring gear 21 meshes with an output gear, not shown, of a starter motor, also not shown. The ring gear 21 is attached to an outer rim of the side plate 17 and specifically is secured by the weld 22 to the side plate 17.

The weld 22 serves for rigidly attaching the ring gear 21 and the side plates 17, 18 together (see FIG. 1).

The center plate 23 is an annular member (see FIGS. 1 to 3) and is disposed on an outer rim of the cylindrical portion 17c of the side plate 17. The center plate 23 has its inner rim side end carried by the cylindrical portion 17c of the side plate 17 for allowing rotation via bearing 28. The center plate 23 is disposed radially inwardly of and at a preset distance from the connecting portions between the side plates 17, 18. The cover members 24, 25 and the side member 26, disposed on both sides of a radially inner portion of the center plate 23, are secured to the center plate by a plurality of rivets 27. This causes the center plate 23 to rotate in unison with the cover members 24, 25. The center plate 23 is rigidly connected by a plurality of bolts 29 to the block member 30 together with the cover members 24, 25 and the side member 26. Thus, the center plate 23 rotates in unison with the front cover 40 of the torque converter 4 via the block member 30. The center plate 23 includes, at its outer periphery, a cut-out-like window 23a in which the seat members 32, 33 and the coil springs 34 to 36 are housed. The window 23a may, at a peripheral end face(s) thereof, be contacted with or detached from the seat members 32, 33. When no torsion has been produced between the side plates 17, 18 and the center plate 23, the window is contacted with both the seat members 32, 33. However, when there is produced a torsion between the side plates 17, 18 and the center plate 23, the window is contacted with one of the seat members 32, 33.

The cover member 24 is an annular plate-shaped member (see FIGS. 1 and 2). The cover member 24 has its radially outer portion clamped between the center plate 23 and the side member 26 and is damped and rigidly caulked by the rivets 27 to the center plate 23 together with the cover member 25 and the side member 26. The cover member 24 is rigidly connected by the bolts 29 together with the center plate 23, cover member 25 and the side member 26 to the block member 30. Moreover, the cover member 24 has its radially inner portion spaced apart from the center plate 23 and is in slidable pressure contact with the protruding portion of the side plate 17. In this manner, a space in which the coil springs 34 to 36 are housed can be shielded from an interstice or gap between the side plate 17 and the center plate 23. It is noted that the cover member 24 is shown pressure contacted with the inner surface of the side plate 17 in FIG. 1 because the space extending from the cover member 24 towards the side at which head parts of the bolts 29 exist is closed by components including the cap 20 and the bearing 28. It is preferred that, in case the space extending from the cover member 24 towards the site at which head parts of the bolts 29 exist is not closed, the abutting structure between the cover member 24 and the side plate 18 is made similar to the abutting structure between the cover member 25 and the side plate 18.

The cover member 25 is an annular plate-shaped member (see FIGS. 1 to 3). The cover member 25 has its radially inner portion clamped between the center plate 23 and the block member 30 and rigidly caulked by the rivets 27 to the center plate 23 together with the cover member 24 and the side member 26. The cover member 25 is also rigidly connected by the bolts 29 together with the center plate 23, cover member 24 and the side member 26 to the block member 30. Moreover, the cover member 25 has its radially outer portion spaced apart from the center plate 23 and is in slidable pressure contact with the abutting portion 18c located at a corner of the inner peripheral end face 18b of the side plate 18 remoter from the center plate 23. That is, the surface of the cover member 25 directed towards the center plate 23 is slidably pressure contacted with the side plate 18 at an outer surface of the side plate directed to the front cover 40. This shields the space housing therein the coil springs 34 to 36 from outside. The cover member 25 may be a thin plate of steel or resin having a force of elasticity (resilient force), thereby to reduce the cost. The cover member 25 is assembled in a condition in which the portion of the cover member 25 destined to have a pressure contact with the side plate 18 is flexed from its free condition, that is, a condition free from stress of the cover member 25, in a direction away from the center plate 23. In the assembled state of the cover member 25, the portion of the cover member 25 is pressure-contacted with the side plate 18. In this manner, a hysteresis torque can be produced on the thrust surfaces when the cover member 25 and the side plate 18 rotate relative to each other. Further, it is designed so as not to produce any gap or interstice caused by size tolerances (fluctuations) of the cover member 25 and the side plate 18.

The side member 26 is an annular plate-shaped member (see FIGS. 1 and 2). The side member 26 presses the radially inner portion of the cover member 24 towards the center plate 23 for rigidly attaching the cover member with the aid of the rivets 27. The side member 26 is staked and rigidly caulked by the rivets 27 to the center plate 23 together with the cover members 24, 25, while being threadedly attached to the block member 30 by bolts 29 together with the center plate 23 and the cover members 24, 25.

The rivets 27 serve for staking and rigidly caulking the cover members 24, 25 and the side member 26 to the center plate 23 (see FIGS. 1 and 2).

The bearing 28 serves for allowing the center plate 23 to rotate relative to the side plate 17 (see FIGS. 1 and 2). The bearing 28 has an inner race secured to the outer peripheral surface of the cylindrical portion 17c of the side plate 17, while having an outer race secured to the inner peripheral end of the center plate 23. It is noted that the bearing 28 is of a sealed structure with grease sealed therein and includes a sealing plate which is formed of a steel plate and synthetic rubber affixed thereto and which is secured to the outer race. The grease can be hermetically sealed within the bearing by a lip at the foremost part of the sealing plate having a sliding contact with the inner race.

The bolts 29 serve for rigidly connecting the center plate 23, cover members 24, 25 and the side member 26 to the block member 30 (see FIGS. 1 and 2).

The block member 30 is an annular block-shaped member used to secure the center plate 23 in position with the aid of bolts 29 (see FIG. 1). The block member 30 is secured at its radially outer and inner sites to the front cover 40 of the torque converter 4 by welds 31. The block member 30 includes a female threaded part at a position corresponding to each bolt 29 for engaging with bolts 29. The block member 30 is fastened (rigidly connected) by the bolts 29 to the center plate 23, cover members 24, 25 and the side member 26 so that the block member can rotate in unison with the center plate 23 and the front cover 40.

The welds 31 serve for rigidly connecting the block member 30 to the front cover 40 of the torque converter 4 (see FIG. 1). The welds 31 rigidly mount the radially outer and inner sites of the block member 30 to the front cover 40.

The seat member 32 is housed within the housing sections 17a, 18a of the side plates 17, 18 and the window 23a of the side plate 23, and is disposed between one circumferential end faces of the housing sections 17a, 18a and the window 23a and one end of the outer coil spring 34 (see FIG. 2). The seat member 32 may be formed of resin to reduce wear caused to the outer coil spring 34. The seat member 32 has a portion which is press fitted into the inside of one end of the inner coil spring 35, disposed within the outer coil spring 34, such as to secure the one end of the inner coil spring 35 by press fitting.

The seat member 33 is housed within the housing sections 17a, 18a of the side plates 17, 18 and the window 23a of the side plate 23, and is disposed between the other circumferential ends of the housing sections 17a, 18a and the window 23a and the other end of the outer coil spring 34 (see FIG. 2). The seat member 33 may be formed of resin to reduce the wear caused to the outer coil spring 34. The seat member 33 has a portion which is press fitted into the inside of the other end of the inner coil spring 36, disposed within the outer coil spring 34, such as to secure the other end of the inner coil spring 36 by press fitting.

The outer coil spring 34 is housed within the housing sections 17a, 18a of the side plates 17, 18 and the window 23a of the center plate 23, and contacts with the seat members 32, 33 arranged on both ends thereof (see FIGS. 1 and 2). The outer coil spring 34 compresses in case the side plates (side plate assembly) 17, 18 and the center plate 23 become distorted relative to each other. Within the inside of the outer coil spring 34, the inner coil springs 35, 36 are disposed respectively towards the seat member 32 and towards the seat member 33 in the circumferential direction. When the side plates 17, 18 and the center plate 23 become distorted relative to each other, the respective turns of the outer coil spring 34 are completely compacted together (brought into tight contact with one another) before complete compaction of the respective turns of both the inner coil springs 35, 36. If the side plates 17, 18 and the center plate 23 become distorted relative to each other, and the turns of the outer coil spring 34 become tightly compacted together, the outer coil spring 34 operates as a stopper that controls the torsion between the side plates 17, 18 and the center plate 23. The spring constants of the outer coil spring 34 are set so as to be smaller than those of the inner coil springs 35, 36. If the side plates 17, 18 and the center plate 23 become distorted relative to each other, the respective turns of the outer coil spring 34 become tightly compacted together after the complete compaction of the respective turns of the inner coil spring 35.

The inner coil spring 35 is disposed more closely to the seat member 32 in the circumferential direction within the inside of the outer coil spring 34 (see FIGS. 1 and 2). One end of the inner coil spring 35 is secured to the seat member 32 by having a stem-like extension of the seat member 32 press-fitted into the inside of the inner coil spring 35. When the side plates 17, 18 and the center plate 23 are not distorted relative to each other, the opposite end of the inner coil spring 35 is spaced apart from one end of the inner coil spring 36. When the side plates 17, 18 and the center plate 23 become distorted relative to each other, and the angle of torsion has reached a preset value, the opposite end of the inner coil spring 35 comes to contact with the one end of the inner coil spring 36. The inner coil spring 35 compresses when the torsion becomes greater than the torsion corresponding to the preset value of the angle of torsion. The spring constant(s) of the inner coil spring(s) 35 is set so as to be greater than those of the outer coil spring 34 and smaller than those of the inner coil spring 36. If the side plates 17, 18 and the center plate 23 become distorted relative to each other, the respective turns of the inner coil spring 35 become completely compacted together before complete compaction of the respective turns of the outer coil spring 34.

The inner coil spring 36 is disposed more closely to the seat member 33 in the circumferential direction within the inside of the outer coil spring 34 (see FIG. 2). The opposite end of the inner coil spring 36 is secured to the seat member 33 by having the stem-like extension of the seat member 33 press-fitted into the inside of the inner coil spring 36. When the side plates 17, 18 and the center plate 23 are not distorted relative to each other, the one end of the inner coil spring 36 is spaced apart from the other end of the inner coil spring 35. When the side plates 17, 18 and the center plate 23 become distorted relative to each other, and the angle of torsion has reached a preset value, the one end of the inner coil spring 36 contacts with the opposite end of the inner coil spring 35. The inner coil spring 36 compresses when the torsion has become greater than that corresponding to a preset value of the angle of torsion. The spring constant(s) of the inner coil spring(s) 36 is set so as to be greater than those of the outer coil spring 34 and those of the inner coil spring 36. If the side plates 17, 18 and the center plate 23 become distorted relative to each other, the respective turns of the inner coil spring 36 are not tightly compacted together before complete compaction of the respective turns of the outer coil spring 34.

The torque converter 4 is a fluid transmitting apparatus which, by exploiting the mechanical action of a fluid contained in a fluid action chamber, causes the torque to be amplified by the differential rotation between an input side pump impeller(s) 42 and a plurality of output side turbine runners 46 (see FIG. 1). The torque converter 4 is provided on a path of motive power transmitting between the torque fluctuation absorbing apparatus 3 and the input shaft 6. The torque converter 4 includes a single-plate lock-up clutch 5 which, when the difference between the number of revolutions of the pump impeller(s) 42 and that of the turbine runners 46 is small, directly couples the pump impeller(s) 42 and the turbine runners 46 to each other to remove the difference between the number of revolutions of the crank shaft 2 and that of the input shaft 6. The torque converter 4 includes, as principal components, the front cover 40, a pump shell 41, the pump impeller(s) 42, a shaft 43, a pump core 44, a turbine shell 45, the turbine runners 46, a turbine core 47, a turbine hub 48, a stator 49, a one-way clutch 50, a shaft 51, a plate member 52, a lock-out piston 53 and a friction material 54.

The front cover 40 is a disk-shaped member of the torque converter 4 disposed on the engine side (towards right in FIG. 1). The front cover 40 is so shaped that it is extended radially outwards from the axis of rotation 7 and its outer peripheral portion is extended towards the transmission (speed changing unit) (towards left of FIG. 1). The outer peripheral end of the front cover 40 is secured by welding to the outer peripheral end of the pump shell 41, so that the front cover rotates in unison with the pump shell 41. Within a space surrounded by the front cover 40 and the pump shell 41, such component parts as the pump impeller(s) 42 as well as the turbine runners 46 are disposed, and an automatic transmission fluid (ATF), as a working fluid, is charged. The motive power of rotation from the engine is transmitted to the front cover 40 via the crankshaft 2 and the torque fluctuation absorbing apparatus 3. The block member 30 of the torque fluctuation absorbing apparatus 3 is welded at 31 to the surface of the front cover 40 directed to the engine (on the right hand side of FIG. 1). The front cover 40 is disposed so that its surface directed to transmission (left-hand surface in FIG. 1) can be frictionally engaged with the friction material 54 of the lock-up clutch 5.

The pump shell 41 is an annular member delimiting a space within which the ATF is to be circulated (see FIG. 1). The pump shell 41 has its outer peripheral end welded to the outer peripheral end of the front cover 40, while having its inner peripheral end welded to the shaft 43. The pump shell 41 rotates in unison with the front cover 40 and the shaft 43. On the engine side surface (right-hand surface in FIG. 2) of the pump shell 41, the pump shell includes a plurality of the pump impellers 42 and revolves in unison with the pump impellers.

The pump impellers 42 represent vane members on the pump side and are disposed facing the turbine runners 46 (see FIG. 1). The outer peripheral ends of the pump impellers 42 are attached to the pump shell 41, while the inner peripheral ends thereof are attached to the pump core 44. The pump impellers 42 rotate in unison with the pump shell 41 and with the pump core 44. The pump impellers 42 are so shaped as to cause the ATF flowing from the stator 49 to be directed towards the turbine runners 46 when the pump shell 41 rotates in one direction.

The shaft 43 is a tubular shaft member carried for rotation by a casing that sheathes the outer peripheral sides as well as the transmission sides of the torque converter 4 and the torque fluctuation absorbing apparatus 3 (see FIG. 1). The shaft 43 is welded to an inner peripheral end of the pump shell 41 and revolves in unison with the pump shell. The shaft 43 is disposed at a preset distance from the outer periphery of the shaft 51.

The pump core 44 is an annular member to which are mounted the inner peripheral ends of the pump impellers 42 (see FIG. 1).

The turbine shell 45 is an annular member that delimits a space within which the ATF is circulated (see FIG. 1). The turbine shell 45 has its inner peripheral portion secured to the turbine hub 48 by a plurality of rivets, not shown. The turbine shell 45 revolves in unison with the turbine runners 46. The turbine runners 46 are rigidly mounted to the transmission side surface or the left-hand side surface in FIG. 1 (inner surface) of the turbine shell 45 so that the turbine shell revolves in unison with the turbine runners 46. A plate member 52 is welded to the engine side or right-hand side surface (outer surface) of the turbine shell 45.

The turbine runners 46 are turbine-side vane members (see FIG. 1) and are mounted facing the pump impellers 42. The turbine runners 46 are attached at their outer ends to the turbine shell 45, while being attached at their inner ends to the turbine core 47. The turbine runners 46 rotate in unison with the turbine shell 45 and with the turbine core 47. The turbine runners 46 are so shaped as to revolve by the ATF forced out by the rotating pump impellers 42 to thrust the ATF towards the stator 49, and are able to revolve independently of the pump impellers 43.

The turbine core 47 is an annular member to which are attached inner peripheral ends of the turbine runners 46 (see FIG. 1).

The turbine hub 48 is a member including a flange part extending radially outwardly from the tubular hub part (see FIG. 1). The turbine shell 45 is secured by a plurality of rivets, not shown, to an outer periphery of the flange part of the turbine hub 48. At the inner rim of the hub part of the turbine hub 48, the turbine hub is connected by splined engagement to the input shaft 6 of the transmission so that the turbine hub is able to move axially but is unable to rotate. The turbine hub 48 revolves in unison with the turbine shell 45 and with the input shaft 6. The lock-up piston 53 includes a cylindrical inner rim that is disposed on the outer peripheral surface of the hub part of the turbine hub 48 so that the cylindrical inner rim can have a sliding contact with the outer peripheral surface of the hub part of the turbine hub. The sliding surfaces of the turbine hub 48 and the lock-up piston 53 are sealed.

The stator 49 includes a plurality of vanes that alter the stream of the ATF returning from the turbine runners 46 to the pump impellers 42 (see FIG. 1). The stator 49 is disposed on a radially inner side between the pump impellers 42 and the turbine runners 46. The stator 49 operates to alter the direction of the ATF flowing from the turbine runners 46 towards the pump impellers 42. The stator 49 is attached via one-way clutch 50 and shaft 51 to a casing, not shown, of the transmission, also not shown, and is able to revolve only in one direction.

The one-way clutch 50 is a clutch that is able to revolve only in one direction (see FIG. 1). As the one-way clutch 50, such a structure employing a roll, a sprag or a ratchet mechanism may be used. The one-way clutch 50 is disposed between the shaft 43 and the turbine hub 48 in the axial direction and between the stator 49 and the shaft 51 in the radial direction. The one-way clutch 50 has an outer race fastened to the stator 49, while having an inner race connected by splined engagement to the shaft 51 so that the one-way clutch is axially movable but unable to rotate.

The shaft 51 is a tubular shaft member non-rotatably attached to a casing, not shown, of the transmission, also not shown (see FIG. 1). The shaft 51 is connected by splined engagement to the inner race of the one-way clutch 50 so that the shaft is axially movable but non-rotatable relative to the inner race. Moreover, the shaft 51 is arranged at a preset spacing from the inner side of the tubular shaft 43 and on top of the outer periphery of the input shaft 6 of the transmission so that the shaft 51 carries the input shaft 6 for rotation via a bush, not shown.

The plate member 52 is an annular member welded to the outer surface of the turbine shell 45 (see FIG. 1). The plate member 52 is connected by splined engagement to the lock-up piston 53, so that the plate member is movable axially but is unable to rotate. The plate member 52 is able to revolve in unison with the turbine shell 45 and with the lock-up piston 53.

The lock-up piston 53 is an annular piston which, when there is only small difference in the number of revolutions of the pump impellers 42 and that of the turbine runners 46, directly connects the pump impellers and the turbine runners together (see FIG. 1). The lock-up piston 53 is arranged between an oil chamber 56 and an oil chamber 57. The oil chamber 56 is provided within a spacing surrounded by the front cover 40 and the pump shell 41 between the lock-up piston 53 and the front cover 40. The oil chamber 57 is provided within the above spacing between the lock-up piston 53 and the pump shell 41. The annular friction material 54 is secured to an outer peripheral surface of the lock-out piston 53 facing the front cover 40 so that the lock-up piston revolves as one with the friction material 54. Since the friction material 54 is frictionally engaged with the front cover 40, the lock-up piston revolves in unison with the crankshaft 2 via the friction material 54, front cover 40 and the torque fluctuation absorbing apparatus 3. The lock-up piston 53 has an outer peripheral end part connected in splined engagement to the plate member 52 so that the lock-up piston will be axially movable but non-rotatable. The lock-up piston 53 is able to revolve in unison with the input shaft 6 of transmission via the plate member 52, turbine shell 45 and the turbine hub 48. The lock-up piston 53 is arranged for sliding axially against the outer peripheral surface of the tubular hub part of the turbine hub 48, and is sealed on a surface thereof sliding against the turbine hub 48. When the oil pressure in the oil chamber 56 is lower than that in the oil chamber 57, the lock-up piston 53 is pressed towards the front cover 40 to cause the friction material 54 and the front cover 40 to be frictionally engaged with each other. When the oil pressure in the oil chamber 56 is higher than that in the oil chamber 57, the lock-up piston 53 is moved in a direction away from the front cover 40 to release the frictional engagement between the friction material 54 and the front cover 40. The oil pressures within the oil chambers 56, 57 are controlled by a hydraulic circuit, not shown, in such a manner that the locked-up state is established by setting the oil pressure within the oil chamber 56 so as to be lower than that in the oil chamber 57 and is released by setting the oil pressure within the oil chamber 56 so as to be higher than that in the oil chamber 57. By the locked-up state is meant such a state in which the difference in the number of revolutions of the crankshaft 2 and that of the input shaft 6 has been removed.

The friction material 54 is an annular member that is attached to the lock-up piston 53 and that may be frictionally engaged with the front cover 40 (see FIG. 1). It may also be the front cover 40 that the friction material is attached to.

According to Example 1, the cover member 25 is pressure contacted with the abutting portion 18c of the side plate 18, located at a corner of the inner peripheral end face 18b disposed remoter from the center plate 23, from an outer side of the side plate 18. Thus, should there be muddy water accumulated in the vicinity of an outer side of the cover member 25, such muddy water may be splashed (whirled) under the centrifugal force radially outwards from the pressure contact site and hence prevented from intruding into the space in which the coil springs 34 to 36 are housed. Moreover, even if the space in which the coil springs 34 to 36 are housed is rapidly cooled by the muddy water such that a pressure in the space has become lower than (negative compared to) the outside atmospheric pressure, the pressure difference on the cover member 25 acts in addition to the force of elasticity of the cover member 25 to enhance the tightness of contact of the abutting portion 18c of the side plate 18 against the cover member 25, thereby assuring secured closure at the abutting portion. Hence, it becomes possible to prevent the muddy water from intruding into the space within which the coil springs 34 to 36 are housed. Additionally, should the centrifugal force be produced as a result of revolutions, not only the force of elasticity of the cover member 25 but also the centrifugal force acting on the cover member 25 will act together to enhance the tightness of contact of the abutting portion 18c against the cover member 25 such as to assure secure closure at the abutting portion. As a result, the muddy water can be prevented more effectively from intruding into the space within which the coil springs 34 to 36 are housed.

The particular exemplary embodiments or examples may be modified or adjusted within the gamut of the entire disclosure of the present invention, inclusive of claims and drawings, based on the fundamental technical concept of the invention. Moreover, a variety of combinations or selection of elements herein disclosed may be made within the concept of the claims. It is to be understood that the present invention may include a variety of combinations or selections that may occur to those skilled in the art in accordance with the total disclosures inclusive of the claims and the drawings as well as the technical concept of the invention.

SYMBOLS 1 motive power transmitting system
2 crankshaft
3 torque fluctuation absorbing apparatus
4 torque converter
5 lock-up clutch
6 input shaft
7 axis of rotation
10 drive plate
11, 12 side members
13 bolt
14 block member
15 weld
16 bolt
17 side plate
17a housing section
17b through-hole
17c cylindrical portion
17d recess
18 side plate
18a housing section
18b inner peripheral end face
18c abutting portion
19 weld
20 cap
21 ring gear
22 weld
23 center plate
23a window
23b support surface
24, 25 cover members
26 side member
27 rivet(s)
29 bearing
29 bolt(s)
30 block member
31 weld(s)
32, 33 seat members
34 outer coil spring
35, 36 inner coil springs
40 front cover
41 pump shell
42 pump impellers
43 shaft
44 pump core
45 turbine shell
46 turbine runners
47 turbine core
48 turbine hub
49 stator
50 one-way clutch
51 shaft
52 plate member
53 lock-up piston
54 friction material
56, 57 oil chambers

The invention claimed is:

1. A torque fluctuation absorbing apparatus, comprising:
a center plate disposed rotatably;
a side plate assembly disposed coaxially with and rotatably relative to the center plate;
at least one elastic member housed within a space delimited by the side plate assembly so as to absorb torque fluctuations produced between a side plate of the side plate assembly and the center plate; and
a cover member secured to the center plate in contact therewith in a continuous manner throughout in a circumferential direction; a surface of the cover member being slidably pressure contacted with the side plate assembly in a continuous manner throughout in the circumferential direction, in such a manner that a space housing the at least one elastic member therein will be shielded from outside;
the cover member being configured to press the side plate assembly with increased pressure when an atmospheric pressure within a space housing the at least one elastic member therein has become lower than an outside atmospheric pressure, wherein
the cover member is an annular plate-shaped member, and
the surface of the cover member slidably pressure contacted with the side plate assembly is, on the same side of the cover member with the surface thereof, secured to the center plate in contact therewith.

2. The torque fluctuation absorbing apparatus according to claim 1, wherein,
the cover member is configured to press the side plate assembly with increased pressure when there acts a centrifugal force.

3. The torque fluctuation absorbing apparatus according to claim 1, wherein,
the cover member is pressure contacted with the side plate assembly in a state in which a portion of the cover member pressure contacted with the side plate assembly is flexed from a free condition in a direction away from the center plate.

4. The torque fluctuation absorbing apparatus according to claim 1, wherein,
   a side of the side plate assembly directed to the center plate has an inner peripheral end face radially outwardly of a portion of the cover member at which the cover member is secured to the center plate; a corner of the inner peripheral end face of the side plate assembly remote from the center plate including an abutting portion disposed so as to have pressure contact with the cover member.

5. The torque fluctuation absorbing apparatus according to claim 4, wherein,
   the corner of the inner peripheral end face of the side plate assembly remote from the center plate is radially at a same distance as or offset radially inwardly of a corner of the inner peripheral end face closer to the center plate.

6. The torque fluctuation absorbing apparatus according to claim 4, wherein,
   the abutting portion of the side plate assembly has a curved profile.

7. The torque fluctuation absorbing apparatus according to claim 4, wherein,
   the abutting portion of the side plate assembly is disposed offset in an axial direction from a site of connection between the center plate and the at least one elastic member.

8. The torque fluctuation absorbing apparatus according to claim 4, wherein,
   the abutting portion of the side plate assembly is disposed radially inward of an outer peripheral end face of the cover member.

9. The torque fluctuation absorbing apparatus according to claim 1, wherein,
   at an opposite site of the side plate assembly relative to the center plate, the side plate assembly includes a cylindrical portion disposed radially inward of the center plate; the cylindrical portion carrying the center plate for rotation via a bearing.

* * * * *